United States Patent Office 2,945,011
Patented July 12, 1960

2,945,011
POLYAMIDES FROM OXAMIC ACIDS

John R. Caldwell and Russell Gilkey, Kingsport, Tenn., assignors to Eastman Kodak Company, Rochester, N.Y., a corporation of New Jersey No Drawing. Filed Aug. 23, 1956, Ser. No. 605,715

4 Claims. (Cl. 260—78)

This invention relates to highly polymeric, high-melting linear condensation polymers and to a process for their preparation comprising introducing (a) one or more of a particular class of oxamic acid diesters and (b) an aliphatic ether diamine and/or a simple diamine into an inert solvent for these two reactants with agitation and separating the highly polymeric polymer when it has been formed. The oxamic acid diesters employed are prepared by reacting an aromatic diamino compound with excess diethyl oxalate. Examples of such aromatic diamines include p-phenylenediamine, 4,4'-methylene-bis-aniline, 1,4-naphthalenediamine, etc. Examples of the aliphatic ether diamines include 3,7-dioxa-1,9-nonanediamine, 3,8-dioxa - 1,10 - decanediamine, etc. The polyamides produce are especially useful for the preparation of synthetic fibers, yarns and fabrics of exceptional utility.

The employment of oxalic acid in the preparation of polyamides is well known in the art. Moreover, it is also known that aromatic diamino compounds can be reacted with oxalic acid to form polyamides. In addition, the employment of aliphatic ether diamines in the preparation of polyamides has been described.

It has now been discovered that exceptionally valuable polyamides can be prepared by a process wherein an aromatic diamine is first reacted with a large excess of an ester of oxalic acid so as to form an oxamic acid diester which is not polymeric in nature. This oxamic acid diester can then be reacted with a bifunctional aliphatic ether diamine to form a highly polymeric, high melting linear polyamide by the usual techniques well known in the art of preparing polyamides by reacting a dicarboxy compound with a diamine. One of the special requirements well known in the art of preparing such polyamides is that the bifunctional dicarboxylic component and the diamine component must be employed in substantially equal molecular proportions.

The preparation of the oxamic diester starting material employed according to this invention does not involve the reaction of oxalic acid and an aromatic diamine in substantially equal molecular proportions since a polyamide would thereby be ordinarily produced which would defeat the purposes of this invention which requires that the initially formed oxamic acid diester must be in monomeric form so that it can then be reacted with a bifunctional aliphatic diamine so as to form the desired highly polymeric linear polyamide.

It is an object of this invention to provide new and useful highly polymeric, high melting linear polyamides.

It is a further object of this invention to provide such polyamides wherein the polymeric chain contains recurring units derived from an aromatic diamino compound, oxalic acid, and an aliphatic ether diamine in regularly recurring units having equal mole proportions of each of the aromatic, oxamic and aliphatic ether residues within each recurring unit.

It is a further object of this invention to provide highly polymeric linear polyamides of exceptional physical and chemical properties adapted to the preparation of fibers, yarns and textile fabrics.

A further object of this invention is to provide a process for the preparation of these novel linear polyamides.

Other objects are apparent elsewhere herein.

In accordance with this invention there is provided a highly polymeric, high melting linear condensation polymer having a molecular structure comprising recurring units having the following formula:

$$-\overset{O}{\underset{\|}{C}}-\overset{O}{\underset{\|}{C}}-NH-R-NH-\overset{O}{\underset{\|}{C}}-\overset{O}{\underset{\|}{C}}-NH-R'-NH-$$

wherein R' represents an aliphatic radical containing from 4 to 15 carbon atoms which contains at least one ether linkage in the chain of atoms separating the —NH— groups, and R represents an aromatic radical containing from 6 to 20 carbon atoms selected from the group consisting of 1,4-phenylene, 1,4-naphthalene, 1,5-naphthalene, 2,6-naphthalene, 4,4'-diphenylene and 4,4' bis phenyl radicals having the following formula:

$$-\langle\phantom{x}\rangle-R''-\langle\phantom{x}\rangle-$$

wherein R'' is selected from the group consisting of $$-\langle\phantom{x}\rangle-$$

—CH$_2$—, —(CH$_2$)$_2$—, —CH(CH$_3$)—, —CH(C$_2$H$_5$)—, —CH(C$_3$H$_7$)—, —C(CH$_3$)$_2$—, —O—, —O—CH$_2$—, —O—(CH$_2$)$_2$—O—, —O—(CH$_2$)$_4$—O—, —S— and —SO$_2$—.

Also in accordance with this invention there is provided a process for preparing a highly polymeric, high melting linear condensation polymer comprising introducing the following two reactants into an inert solvent for these two reactants with agitation at an elevated temperature and separating the highly polymeric polymer produced; said reactants being: (a) about 1 mole proportion of an oxamic acid diester having the formula:

$$R'''-O-\overset{O}{\underset{\|}{C}}-\overset{O}{\underset{\|}{C}}-NH-R-NH-\overset{O}{\underset{\|}{C}}-\overset{O}{\underset{\|}{C}}-R-R'''$$

and (b) about 1 mole proportion of an aliphatic ether diamine having the formula:

$$NH_2-R'-NH_2$$

wherein R and R' have been defined and R''' represents an alkyl radical containing from 1 to 6 carbon atoms.

Of course, it is obvious that the bifunctional reactant compounds employed in accordance with practicing this invention as described above can be replaced with various equivalent bifunctional compounds in any manner known in the art. Moreover, the process of preparing the polyamides of this invention resides basically in heating the two bifunctional reactants until the product has polymerized to the fiber forming stage which stage is not generally reached until the polyamide has an intrinsic viscosity of at least 0.4 and preferably above 0.6. Although various methods of accomplishing this condensation reaction are available, the most practically useful has been referred to hereinabove and involves the employment of an inert solvent using techniques well known in the art.

Although this invention is primarily directed to the preparation of polyamides employing an aliphatic ether diamine according to the process described above, up to about 75 mole percent or more of the aliphatic ether diamine can be replaced with an aliphatic diamine containing no ether linkages. In fact, the products described above can be prepared without any aliphatic ether diamine employing only a simple aliphatic diamine containing only carbon atoms between the amino groups; however, the latter polyamides are not as satisfactory in some regards, especially since they do not have as great receptivity for cellulose acetate dyes, acid wool dyes and other dyes as do those polyamides containing at least 25 mole percent of an aliphatic ether diamine in the total quantity of aliphatic diamine employed.

In general, the products of this invention have melting points above 200° C. and in some cases the melting point is 270° C. or higher. The polyamides of this invention are of particular value for the production of textile fibers, yarns and fabrics. They are also useful for the manufacture of photographic film base, molded objects, coating compositions, etc. Thus, they can be used in any of the numerous applications to which synthetic polymeric amides have been put, e.g. bristles, adhesives, molding compositions, etc. For some of these uses the polyamides of this invention can be employed in conjunction with other polyamides and/or in conjunction with other resins, cellulosic materials, plasticizers, pigments, delusterants, antioxidants, and other materials. Although this invention relates primarily to the highly polymeric polyamides described herein, it is obvious that less highly polymeric products can be produced and used as modifiers for other resinous compositions in the form of plasticizers, etc.

The polyamides of this invention as described above can be advantageously prepared by carrying out the described process at any temperature from room temperature up to about 200° C. or higher. It is ordinarily advantageous to heat the reactants in the solvent for the reactants at a sufficiently elevated temperature to permit the reaction to be accomplished in a reasonably short period of time, although this can sometimes be accomplished without any heating. Temperatures of 40–50° C. for a period of about 24 hours are illustrative of reaction conditions that produce a polyamide in accordance with this invention. If desired, the temperature can be maintained at 40–50° C. for a shorter period of time followed by a short period at a much higher temperature such as 150–160° C. for one hour. Of course, higher temperatures produce faster polymerization but may sometimes result in some discoloration. The dedegree of polymerization can be ascertained any time during the course of the reaction by checking the intrinsic viscosity of the polymer that has been formed. Such a technique is well known in the art and as mentioned above, an intrinsic viscosity of about 0.6 is preferred in order to consider the polymerization sufficiently complete to produce the especially desirable highly polymeric polyamides of this invention. Generally the polyamides of this invention have an intrinsic viscosity approaching 1.0 or higher.

The inert solvents which can be employed advantageously in carrying out the process of this invention include such well known and commonly employed solvents such as dimethylformamide, dimethylacetamide, 1,4-dioxane, nitrobenzene, isomers and mixtures of isomers of phenols such as cresol, sulfolane, etc. There are numerous other similar inert solvents which are capable of dissolving both of the reactants used in preparing the polyamides of this invention. These solvents need not necessarily be solvents for the highly polymeric polyamide being produced. For example, 1,4-dioxane may be a solvent for the reactants in many instances but may not be a solvent for the polyamide produced except at an elevated temperature. In this case, upon cooling the solution in 1,4-dioxane of a polymerized highly polymeric polyamide, the polyamide would separate therefrom.

In many instances, the separation of the highly polymeric polyamide from the reaction mixture can be advantageously facilitated by admixing a known nonsolvent for the polyamide. This will cause the polyamide to separate from the reaction mixture as a solid which can be readily isolated from the liquid by any of the ordinary techniques. The examples of suitable nonsolvents which can be advantageously employed include methyl alcohol, ethyl alcohol, isopropyl alcohol, methoxyethanol, 1,4-dioxane, tertiary butyl alcohol, propoxypropanol and various other aliphatic alcohols and ethers containing from 1 to 10 carbon atoms. Of course, there are many other nonsolvents including heterocyclic compounds, aromatic compounds, aralkyl and alkaryl compounds, etc.

The oxamic acid diester which is one of the monomeric starting materials of this invention can be advantageously prepared by refluxing an aromatic diamino compound with an excess of a lower dialkyl ester of oxalic acid such as ethyl oxalate as described in Ber. 29, 2640 (1896) and Ber. 30, 768 (1897). Among the examples of aromatic diamines which can be employed are: p-phenylenediamine, 1,4-naphthylenediamine, 1,5 - naphthylenediamine, 2,6 - naphthylenediamine, etc. With p-phenylenediamine, for example, the product is the diethyl ester of p-phenylenedioxamic acid which has the structure:

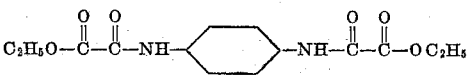

A particularly useful class is represented by the 4,4'-substituted dioxanilic acid esters having the general structure:

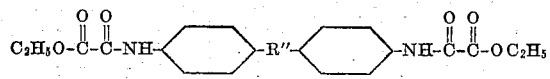

wherein R″ represents a radical as defined hereinabove. Obviously, other alkyl diesters are of similar utility, e.g. methyl esters, hexyl esters, etc. Of course, there are many other aromatic diamines which can be similarly employed in accordance with this invention to produce oxamic acid diesters falling within the above-described group of compounds which can be employed as one of the monomeric starting materials of this invention.

As explained above, the oxamic acid diester starting material is reacted with an aliphatic ether diamine of the general formula given above. Aliphatic diamines containing one or more ether linkages in the chain are of particular value. Suitable examples are:

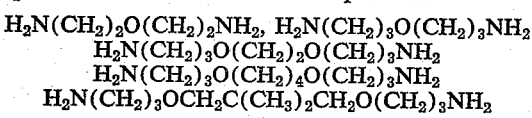

etc.

Further examples of diamines which contain at least two hetero oxygen atoms in the chain separating the amino groups and which are suitable for use in the practice of this invention include bis-aminopropoxyhexane, i.e.,

3,7 - dioxa - 1,9 - nonanediamine, 3,8 - dioxa - 1,10-decanediamine, 3,9 - dioxa - 1,11 - hendecanediamine, 3,10 - dioxa - 1,12 - dodecanediamine, 3,11 - dioxa - 1,13-tridecanediamine, 4,7,10 - trioxa - 1,13 - tridecanediamine 3,12 - dioxa - 1,14 - tetradecanediamine, 3,13 - dioxa-1,15-pentadecanediamine, and higher homologs, 4,7-dioxa-1,10-decanediamine, 5,8-dioxa-1,12-dodecanediamine, 4,8-dioxa-1,11-hendecanediamine, and 5,9-dioxa-1,13-tridecanediamine. It is also possible to use diamines containing two oxygen hetero atoms in the chain which contains aromatic or hydroaromatic rings. Examples of such are diphenylolpropane-di-beta-aminoethyl ether, 1,4-dihydroxybenzene-di-beta-aminoethyl ether, and

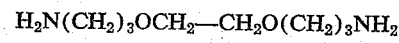

As already explained, the especially advantageous products of this invention are based upon the employment of an aliphatic diamine composed of at least 25% of an aliphatic ether diamine having the formula defined above which can be modified with any bifunctional aliphatic di-primary amine useful in the preparation of highly polymeric polyamides such compounds especially those that contain 4 or more carbon atoms between the amino groups. Examples include 1,2-diaminopropane, 1,4-diaminobutane, 1,6-diaminohexane, 1,6-diaminoheptane, 1,10-diaminodecane, 2-methyl-1,6-diaminohexane, 3-ethyl-1,5-diaminopentane, and 2-ethyl-1,4-diaminobutane, etc. Moreover, modified polyamides are also contemplated wherein the reactants include glycols, aminoalcohols, amino-carboxylic acids, hydroxy-carboxylic acids, etc.

This invention can be further illustrated by the following examples of preferred embodiments although it will be understood that these examples are included merely for purposes of illustration and are not intended to limit the scope of the invention unless otherwise specifically indicated.

*Example 1.—Polyamide having these recurring units*

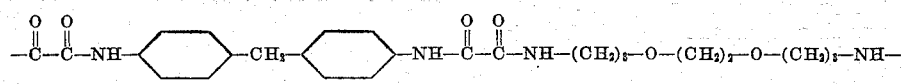

4,4'-Methylene-bis-aniline was refluxed with excess ethyl oxalate and the product was recrystallized from a mixture of isopropyl alcohol and benzene to give 4,4'-methylenedioxanilic acid diethyl ester, M.P. 156° C., having the formula:

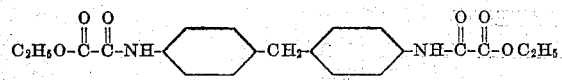

298 g. (1.0 mole) of this dioxanilic diester was dissolved in 15 liters of anhydrous methanol and the solution was mixed at room temperature with 178 g. (1.0 mole) of $H_2N(CH_2)_3O(CH_2)_2O(CH_2)_3NH_2$ dissolved in 300 cc. of methanol. A white precipitate formed after a few minutes and the slurry was agitated at 40–50° C. for 24 hours. The polymer was filtered, washed with methanol, and dried. The yield was practically quantitative. The polyamide melted at 270–280° C. It was soluble in hot cresol. Strong, elastic fibers were obtained by the melt spinning process. These fibers were formed into yarns and woven into fabrics which possessed excellent physical and chemical characteristics suitable for the manufacture of wearing apparel which could be processed and used quite satisfactorily.

*Example 2.—Polyamide having these recurring units*

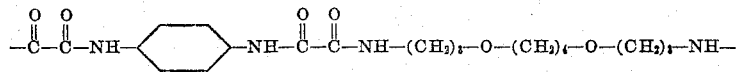

p-Phenylenediamine was heated with excess ethyl oxalate as described in Ber., 29, 2640 (1896) to give the diethyl ester of p-phenylenedioxamic acid (M.P. 215°). One molecular proportion thereof was dissolved in cresol to give a 15% solution, and one molecular proportion of $H_2N(CH_2)_3O(CH_2)_4—O(CH_2)_3NH_2$ was added. The mixture was stirred at 40–50° C. for 10 hours and then heated at 150–160° C. for 1 hour. The polyamide was precipitated by pouring into methyl alcohol. The polyamide melted at 280–290° C. Fibers were obtained by the melt-spinning process. These fibers had excellent qualities suitable for fabrics useful for wearing apparel, laminates, etc.

*Example 3.—Polyamide having these recurring units*

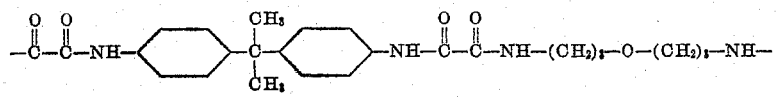

A dioxanilic acid ester was prepared in the same manner as described above, namely 4,4'-(2,2-propylene)dioxanilic acid diethyl ester. One molecular proportion of this oxamic diester was mixed in dioxane solution with one molecular proportion of $H_2N(CH_2)_3O(CH_2)_3NH_2$. The mixture was stirred at 40–50° C. for 6 hours, then at 100° C. for 3 hours. The polymer was filtered, washed with 1,4-dioxane, and dried. The dried polymer was then heated in vacuum at 200–210° C. for 2 hours. The polyamide melted at 250–260° C. It was useful for the production of fibers, films, and molded objects.

*Example 4.—Modified polyamide*

Using the methods described above, a dioxanilic acid ester was prepared having the structure:

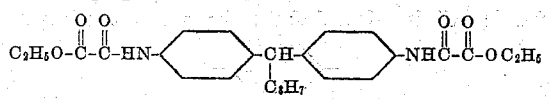

A polyamide was prepared from this diester with an equimolar mixture of 50% of 2-methyl-1,6-hexamethylenediamine and 50% of $H_2N(CH_2)_3O(CH_2)_3NH_2$. This modified polyamide was useful for the production of fibers, films, and molded objects. Fabrics prepared from the fibers were found to be quite satisfactory in their physical and chemical characteristics and could be dyed and processed satisfactorily.

*Example 5.—Modified polyamide*

A dioxanilic acid ester was prepared in the manner described above having the structure:

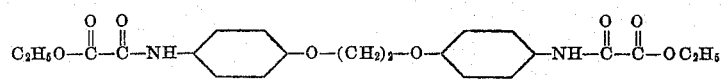

The polyamide was prepared from 40 mole percent of 1,2-diaminopropane and 60 mole percent of $$H_2N(CH_2)_3O(CH_2)_3NH_2$$

condensed with an equimolar quantity of the above dioxanilic acid diester. It was useful for the manufacture of fibers, films, and molded objects.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A readily dyeable, water-insoluble fiber of a highly polymeric, linear condensation polymer melting at above 200° C., having an intrinsic viscosity of at least 0.4 and having a molecular structure consisting essentially of identical recurring units having the following formula:

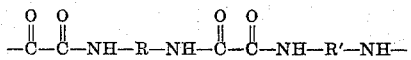

wherein R' represents an aliphatic radical containing from 4 to 15 carbon atoms which contains at least one ether linkage in the chain of atoms separating the —NH— groups, and R represents an aromatic radical containing from 6 to 20 carbon atoms selected from the group consisting of 1,4-phenylene, 1,4-naphthalene, 1,5-naphthalene, 2,6-naphthalene, 4,4'-diphenylene and 4,4'-bis phenyl radicals having the following formula:

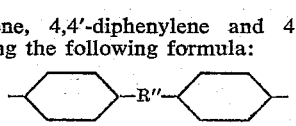

wherein R" is selected from the group consisting of

—CH$_2$—, —(CH$_2$)$_2$—, —CH(CH$_3$)—, —CH(C$_2$H$_5$)—, —CH(C$_3$H$_7$)—, —C(CH$_3$)$_2$—, —O—, —O—CH$_2$—, —O—(CH$_2$)$_2$—O—, —O—(CH$_2$)$_4$—O—, —S— and —SO$_2$—.

2. A highly polymeric, high-melting linear condensation polymer as defined by claim 1 melting at about 270°–280° C. and wherein said units have the following formula:

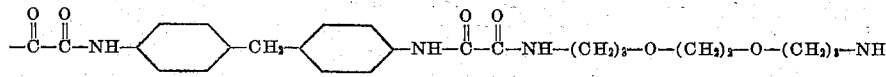

3. A highly polymeric, high-melting linear condensation polymer as defined by claim 1 melting at about 280–290° C. and wherein said units have the following formula:

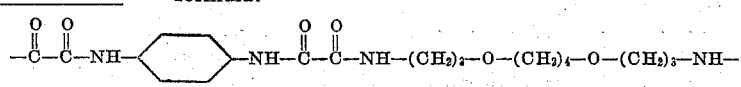

4. A highly polymeric, high-melting linear condensation polymer as defined by claim 1 melting at about 250–260° C. and wherein said units have the following formula:

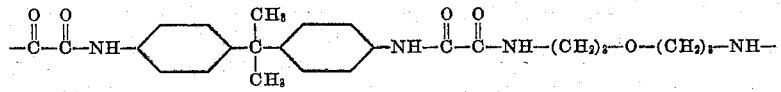

References Cited in the file of this patent

UNITED STATES PATENTS

| | | |
|---|---|---|
| 2,191,556 | Carothers | Feb. 27, 1940 |
| 2,356,702 | Schlack | Aug. 22, 1944 |
| 2,558,031 | Allen et al. | June 26, 1951 |